Figure 1:
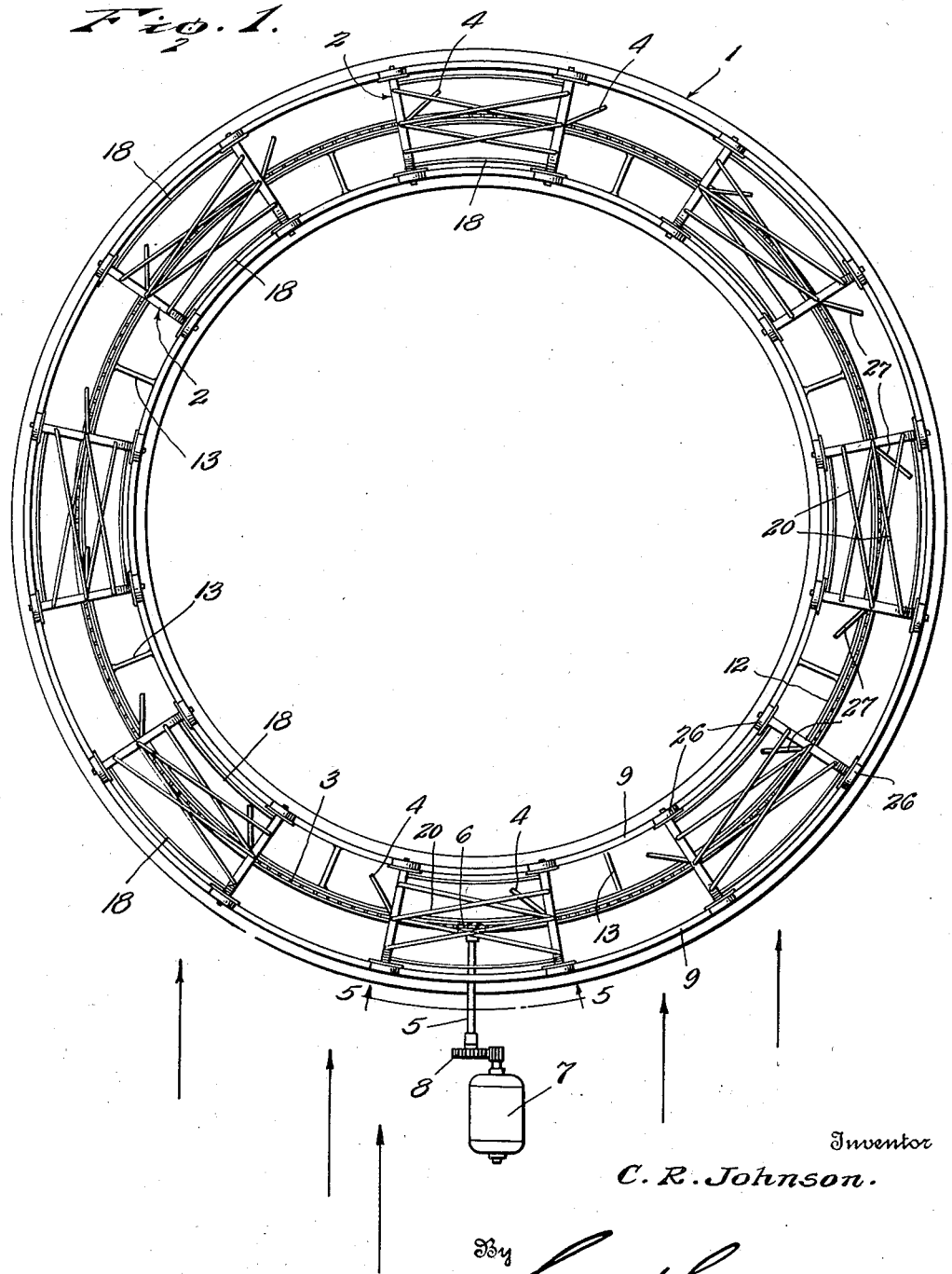

Nov. 2, 1937.  C. R. JOHNSON  2,097,667
WIND MOTOR
Filed Dec. 14, 1936   3 Sheets-Sheet 1

Inventor
C. R. Johnson.
By Lacey & Lacey, Attorneys

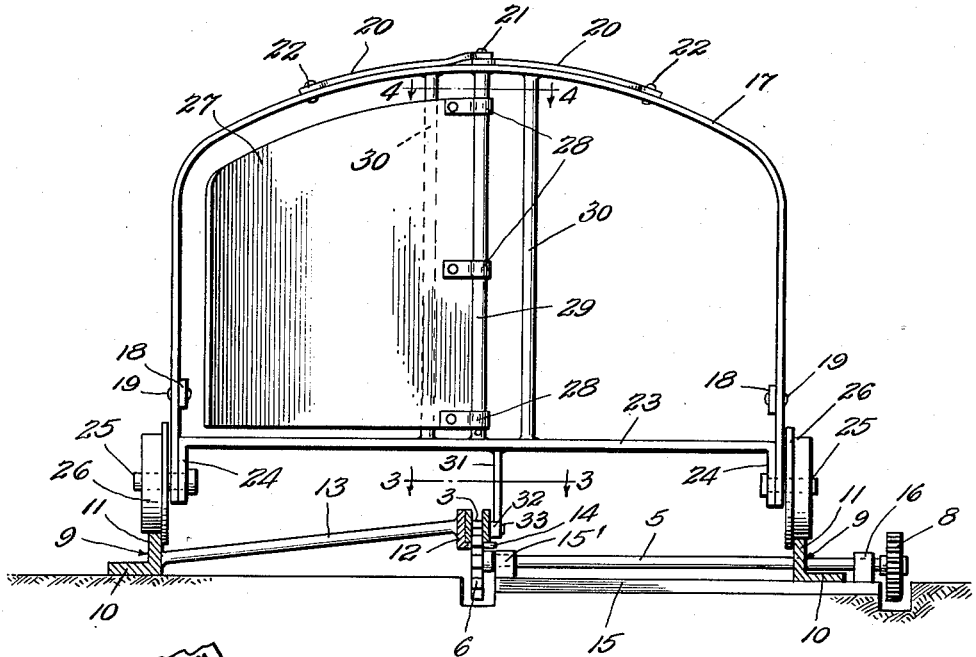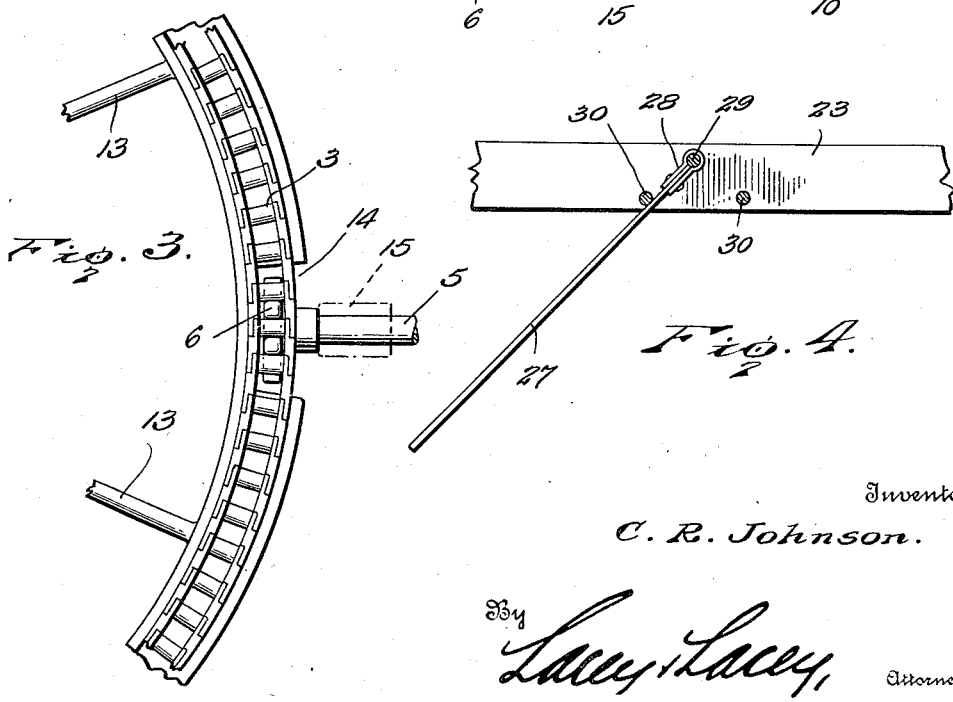

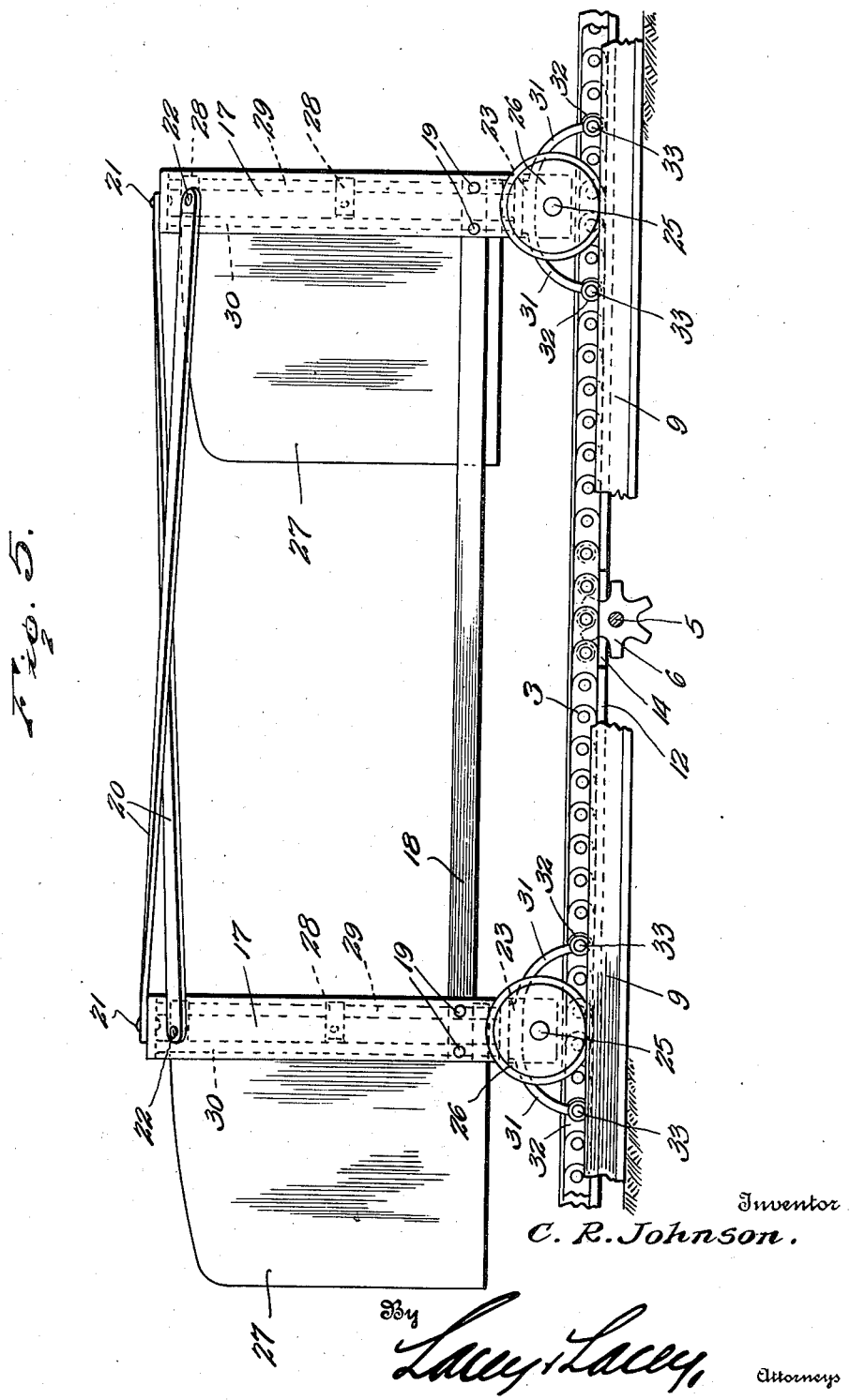

Patented Nov. 2, 1937

2,097,667

UNITED STATES PATENT OFFICE 2,097,667

WIND MOTOR

Claude R. Johnson, Hugoton, Kans.

Application December 14, 1936, Serial No. 115,865

5 Claims. (Cl. 170—6)

This invention relates to wind motors and one object of the invention is to provide an apparatus of this character wherein wind-driven units are mounted to travel along a track and connected with a sprocket chain so that, as the units move, the sprocket chain will be shifted longitudinally and rotary motion transmitted by a sprocket wheel to a shaft to which a generator is geared.

Another object of the invention is to provide in an apparatus of this character an improved form of wind-driven units and to provide these units with vanes so mounted that the action of wind against the vanes may move them from a neutral position to a position in which force will be exerted to impart movement to the units.

Another object of the invention is to so construct the units that they will be of light weight and very easily moved by action of wind against their vanes and at the same time have the units of strong construction.

Another object of the invention is to provide in an apparatus of this character tracks which may have any desired number of units mounted thereon and also serve as a carrier for the sprocket chain which is so connected with the units that the sprocket chain will be moved longitudinally when the units are in motion and also serve to hold wheels of the units in engagement with rails of the track and thus prevent the units from jumping the track when traveling at high speed.

The invention is illustrated in the accompanying drawings, wherein

Figure 1 is a top plan view of the wind motor,

Figure 2 is a view upon an enlarged scale taken transversely through the track and looking toward one of the units which is illustrated in end elevation, Figure 3 is an enlarged fragmentary view taken along the line 3—3 of Figure 2 and illustrating the manner in which the sprocket chain is mounted, Figure 4 is a fragmentary sectional view taken along the line 4—4 of Figure 2, and Figure 5 is a view taken along the line 5—5 of Figure 1 and showing one of the units in side elevation.

This improved wind motor consists briefly of a track, indicated in general by the numeral 1, a plurality of units 2 connected with a sprocket chain 3 and provided with vanes 4 to be acted upon by wind to move the units along the track and carry the chain with them so that a shaft 5 carrying a sprocket wheel 6 which engages the sprocket chain will be rotated and a generator 7 geared to the shaft 5, as shown at 8, set in motion to generate electricity. While eight units have been shown in Figure 1, it is to be understood that any number desired may be employed according to the size of the track. It will also be understood that the track may be circular, elliptical, oval or any other desired shape.

The track is provided with rails 9 upon which the wheels of the unit rest, and referring to Figure 2, it will be seen that the rails have been shown formed of angle metal to provide each rail with a flat base 10 and an upstanding flange 11 for engagement by the wheels. The rails may be mounted upon ties or any other desired support or foundation, or may rest directly upon the ground. Midway the rails 9 is disposed a chain-supporting rail 12 which is also formed of angle metal and this chain-supporting rail is supported and maintained in its proper position midway the rails 9 by rigid bars 13 extending between the rail 12 and the inner rail 9. It will thus be seen that the chain-supporting rail will be firmly held and prevented from shifting transversely of the track out of its proper location midway the two rails 9. At one point a portion of the horizontal flange of the chain-supporting rail is cut-out, as shown at 14, thus providing a space through which the sprocket wheel 6 may project upwardly for intermeshing engagement with links of the sprocket chain, as clearly shown in Figures 2 and 3. At this point in the track a tie or bolster 15 extends transversely thereof with its outer end portion extending under the outer rail 9 and its inner end carrying a bearing 15' to rotatably support the inner portion of the shaft 5. The outer end portion of the shaft 5 is journaled through the outer rail and the tie carries a bearing 16 for the outer end portion of the shaft. Therefore, the shaft 5 will be well supported and prevented from shifting out of geared connection with the shaft of the generator 7.

Each of the units is constructed as illustrated in Figures 2 and 5 and is provided with end yokes or bows 17 formed of strips of strong metal bent to assume the bowed shape shown in Figure 2. The two yokes are connected by side bars 18 extending longitudinally of the unit or carriage and having their ends very firmly secured against lower portions of the arms of the yoke by rivets, bolts or other suitable fasteners 19. There have also been provided bracing bars 20 for upper portions of the yoke which extend longitudinally of the unit or carriage with their ends secured midway the width of the yoke, as shown at 21. The other ends of the bracing bars are secured to the yoke in spaced relation to each other by the fasteners 22, as clearly shown in Figure 2, and when so secured the braces extend diagonally in crossed relation to each other, as shown in Figures 1 and 5. It will thus be seen that the two yokes will be firmly secured in upright positions and held in proper spaced relation to each other by the side bars 18 and the bracing bars 20. A bridge 23 extends between lower end portions of the arms of each yoke and is formed with depending arms 24 at its ends which are firmly secured against lower ends of the arms of the yoke. Through the contacting portions of the arms of the yoke 17 and their bridges 23 extend axles 25 upon which the wheels 26 of the unit or carriage are mounted and since the wheels are carried by portions of the axles which project outwardly from the arms of the yoke and have flanges for engaging the inner side faces of the wheel-engaging flanges 11 of the rails, the wheels will be prevented from accidentally moving off the axle even if cotter keys, nuts or other fastening means for the wheels should be omitted from outer ends of the axles.

In order that movement may be imparted to the units, each unit is provided at its ends with vanes 27 which have been shown in the form of sheet metal plates but may be frames covered with fabric if so desired. Each of the vanes extends vertically and has its inner end provided with thin straps 28 engaged loosely about a mounting post 29 disposed vertically midway the width of the unit or carriage and having its upper and lower ends firmly secured in any desired manner to the companion yoke 17 and its bridge 23. Abutment rods 30 extend vertically at opposite sides of each mounting post 29 in spaced relation thereto and out of alined relation to the mounting post, as shown in Figure 4, so that, while the vane carried by the mounting post may swing about the same, its swinging movement will be limited in either direction and the vane thus prevented from moving about the post beyond the position shown in Figures 1 and 4. By this arrangement wind may cause the vanes to be swung about the posts from one side to the other as the units move along the track but swinging movement of the vanes will be limited and the vane will be braced after moving to the position to engage a rod as shown in Figure 4 and provide a rigid surface of large area for wind to act against, as shown in Figure 1, and cause the units or carriage to be propelled along the track. Arms 31 extend downwardly from opposite sides of the bridges or bars 23 and at their lower ends are provided with eyes 32 through which extend pins 33, by means of which certain of the links of the sprocket chain 3 are connected with the arms. This is clearly shown in Figure 5, and referring to this figure, it will be readily seen that, as the units are propelled along the track, the sprocket chain will be moved longitudinally of the track and rotary motion imparted to the transmission shaft 5.

Having thus described the invention, what is claimed as new is:

1. In a wind motor, an endless track, units movable along said track and having means adapting them to be propelled by wind pressure, a support extending longitudinally of said track intermediate the width thereof and having a portion formed with a cut-out, a sprocket chain slidable along said support and connected with said unit and moving with the unit, and a shaft for transmitting rotary motion to a generator rotatably mounted and extending transversely of the track under said support, and a sprocket wheel carried by said shaft with a portion extending through the cut-out and engaging the sprocket chain and adapted to cause rotary motion to be transmitted to the shaft from the sprocket chain when the units and the sprocket chain are in motion.

2. In a wind motor, a track, a supporting rail extending longitudinally of said track intermediate the width thereof and provided with a horizontal flange and a vertical flange, the horizontal flange being provided with a cut-out, a sprocket chain slidably supported by said rail for movement along the same over the cut-out thereof, a shaft for transmitting motion to a generator rotatably mounted transversely of said track and having a portion extending under the supporting rail and provided with a sprocket wheel extending upwardly through the cut-out and meshing with the sprocket chain, and wind-driven units movable along said track and connected with said sprocket chain for shifting the sprocket chain longitudinally as they are moved along the track.

3. In a wind motor, a track, a sprocket chain mounted for longitudinal movement along the track, a shaft for transmitting motion to a generator, a sprocket wheel carried by said shaft and meshing with said sprocket chain for rotation of the shaft from the chain during motion of the chain, and units connected with said chain and movable along said track to impart movement to the chain, each unit comprising a carriage having supporting wheels resting upon the track, vertical yokes spaced from each other longitudinally of the carriage, cross bars carried by said yokes, posts extending vertically between said cross bars and upper portions of said yokes, vanes pivoted to said posts for movement into and out of position for action thereon by wind, and bars extending vertically between the cross bars and upper ends of the yoke in spaced relation to opposite sides of the posts for limiting swinging movement of said vanes and providing abutments therefor when acted upon by wind.

4. In a wind motor, a track, a sprocket chain movable along said track, a drive shaft for a generator adapted to be rotated from said sprocket chain during movement of the sprocket chain, and wind-driven units for imparting movement to said chain movable along the track and connected with the chain, each unit having end yokes disposed substantially vertically, supporting wheels carried by the end frames and resting upon said track, bracing bars connecting said end frames, pivot posts disposed vertically in the end frames intermediate the width of the frames, vanes pivoted to swing horizontally about said posts into and out of position to be acted upon by wind, and vertically extending abutments carried by the frames in spaced relation to opposite sides of said posts for engagement by said vanes to limit swinging movement of the vanes.

5. In a wind motor, a track, a sprocket chain movable along said track, a shaft for imparting motion to a generator rotatably mounted and adapted to receive motion from the sprocket chain, and wind-driven units movable along said track and connected with said chain, each unit comprising end yokes having vertically disposed side arms and a bridge extending between the lower end portions of the side arms and formed with arms secured thereto, wheels for moving along said track having axles extending through the contacting portions of the arms of the yoke and bridge, bracing bars extending between said yokes and having their ends secured thereto, posts disposed vertically with their upper ends secured to the yokes and their lower ends secured to the bridges thereof, vanes mounted to swing about the posts into and out of position for action by wind, abutment bars spaced from opposite sides of said posts for engagement by the vanes to limit swinging movement of the vanes, and arms depending from the bridges and connected with the sprocket chain.

CLAUDE R. JOHNSON.